United States Patent [19]

Kang et al.

[11] Patent Number: 5,411,573
[45] Date of Patent: May 2, 1995

[54] RECOVERY OF PRECIOUS METALS FROM ACID SOLUTIONS BY N-CONTAINING ELECTROACTIVE POLYMERS

[75] Inventors: En-Tang Kang; Yen P. Ting; Koon G. Neoh; Kuang L. Tan, all of Singapore, Singapore

[73] Assignee: National University of Singapore, Kent Ridge, Singapore

[21] Appl. No.: 139,856

[22] Filed: Oct. 22, 1993

[51] Int. Cl.$^6$ ............................................. C22B 3/24
[52] U.S. Cl. .............................. 75/721; 423/DIG. 14
[58] Field of Search .................. 75/723; 423/DIG. 14

[56] References Cited

U.S. PATENT DOCUMENTS

| | | | |
|---|---|---|---|
| 3,736,126 | 5/1973 | Fritz et al. | 75/118 |
| 4,289,531 | 9/1981 | Lechavelier et al. | 423/22 |
| 4,581,220 | 4/1986 | Nelson | 75/723 |
| 4,769,223 | 9/1988 | Volesky et al. | 423/22 |
| 4,857,159 | 8/1989 | Davis | 75/723 |
| 5,131,943 | 7/1992 | Allison | 423/DIG. 14 |

FOREIGN PATENT DOCUMENTS

| | | |
|---|---|---|
| 3401961 | 8/1984 | Germany . |
| 238033 | 8/1986 | Germany . |
| 2-15128 | 1/1990 | Japan . |
| 2-80528 | 3/1990 | Japan . |
| 86/03480 | 6/1986 | WIPO . |

OTHER PUBLICATIONS

E. T. Kang et al., "The Intrinsic Redox States in Polypyrrole . . . ", *Surface & Interface Analysis,* vol. 19, pp. 33–37 (1992).

Gloria J. McDougall et al., "Activated Carbons and Gold—A Literature Survey", *Minerals Sci. Engng,* vol. 19, No. 2, pp. 84–99, Apr. 2, 1980.

*Primary Examiner*—Peter D. Rosenberg
*Attorney, Agent, or Firm*—Birch, Stewart, Kolasch & Birch

[57] ABSTRACT

The present invention is directed to a process for reducing the oxidation state of a metal by contacting an acidic solution of the metal with an electroactive polymer, and accumulating and recovering the metal. More particularly, the invention is directed to a method for recovering precious metals like gold, platinum, palladium, and gold-platinum alloys from acidic solution by contacting the solution with an electroactive polymer like polyaniline or polypyrrole.

23 Claims, 1 Drawing Sheet

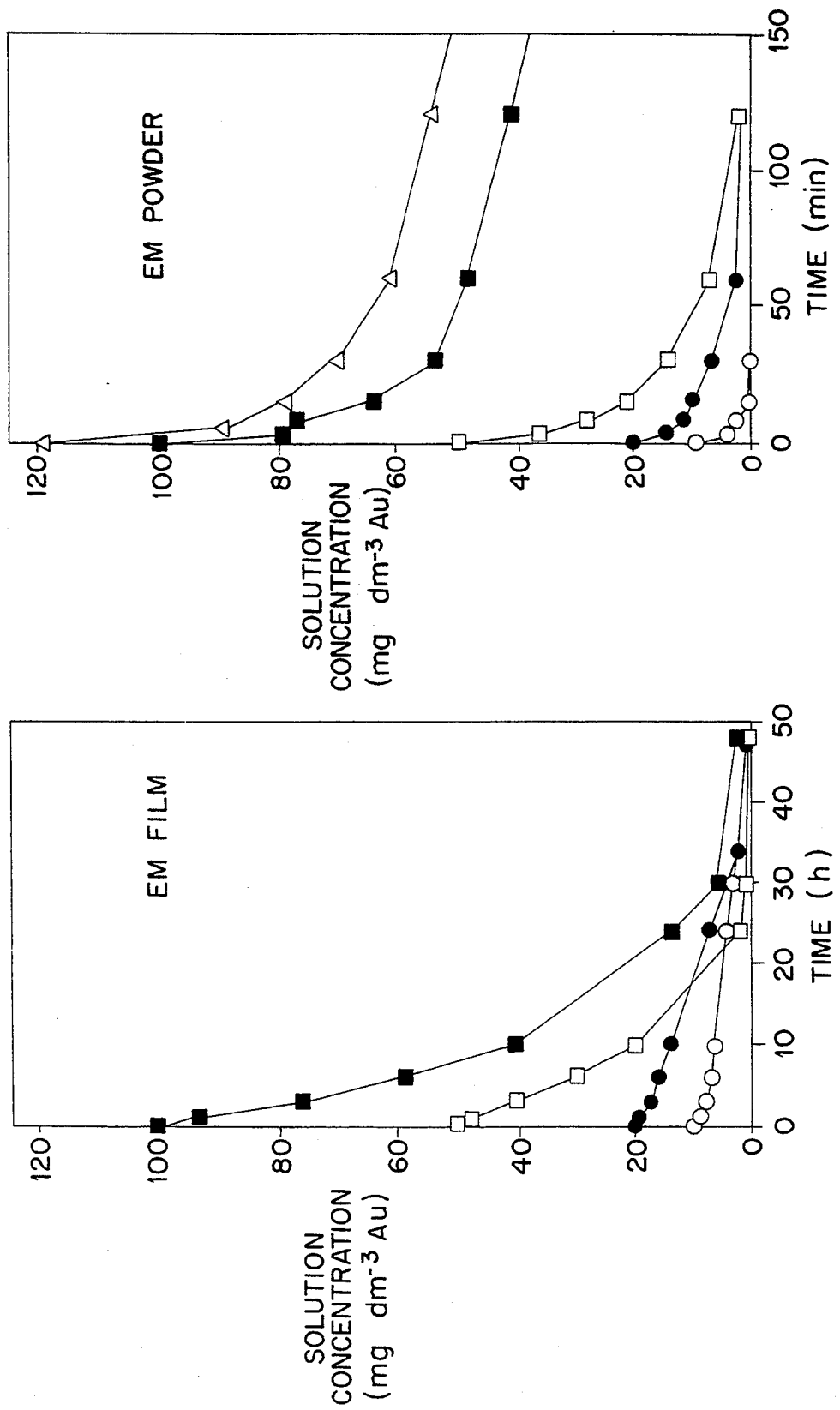

RECOVERY OF PRECIOUS METALS FROM ACID SOLUTIONS BY N-CONTAINING ELECTROACTIVE POLYMERS

BACKGROUND OF THE INVENTION

1. Field of the Invention

This invention relates to the spontaneous and self-sustained reduction and accumulation of precious metals, such as gold (AU), platinum (Pt), and palladium (Pd) from acid solutions by electroactive polymers, such as polyaniline (PAN), polypyrrole (PPY) and their analogs and derivatives, which are capable of assuming a number of intrinsic redox states. A typical polymer film is capable of accumulating more than 5 times its own weight of a precious metal.

2. Description of the Related Art

Gold is a precious metal which has always been in high demand for its decorative and ornamental purposes for centuries. Together with other precious metals, such as platinum and palladium, these metals are of strategic importance for the present day high-technology and electronic industries. Thus, recovery of these precious metals from primary and secondary sources, such as natural ores, leach solutions, electronic scraps, and waste electroplating solutions, has become an important technology. Recovery of these and other precious metals by less energy intensive processes, such as gold reduction or accumulation by polymeric adsorbents, by biomass and biomaterials, by activated carbon, and by electroless plating are well-documented in the literature. The have been described, for example, in "Advances in precious Metals Recovery", edited by N. Arbiter and K. N. Han, Gordon and Breach Science Publishers, N.Y. (1990); and in G. J. McDougall and R. D. Hancock, *Minerals Sci. Engng,* 12, 85 (1980). Cyanidation, until recently, has been the only alternative to remove small particles of gold from slime on an industrial scale. Gold chlorination and gold extraction from acid solutions have risen to prominence during the last two decades, as this recovery route does not have the adverse environmental effects of cyanidation. Thus, as the demand for gold and other precious metals increases, extraction of these materials from their acid solutions must be accomplished with greater efficiency.

In a parallel development, electroactive (conductive) polymers have emerged in the last two decades as a new class of materials with interesting electrical and electronic properties. A number of electrically conductive or semiconductive polymeric materials are known. They have been described, for example, in "A Handbook of Conducting Polymers" Vols I and II, edited by T. Skotheim, Marcel Dekker, N.Y. (1986). Polymers with conjugated backbones are of particular interest. The electrical conductivities of such materials may be made to undergo a metal-like transition, via the process of chemical or electrochemical doping (oxidation, reduction and protonation, etc.). Four main classes of such conjugated polymers have been identified, viz., poly(acetylene) and its derivatives, poly(phenylene) and its derivatives, poly(heterocyclic) polymers, and the aniline polymers. Of these polymers, polyaniline (PAN) and polypyrrole (PPY) and their derivatives have been of particular interest because of their high electrical conductivity, environmental stability and interesting intrinsic redox properties associated with the chain nitrogens. The last properties have been studied in detail in E. T. Kang, K. G. Neoh and K. L. Tan, "The Intrinsic Redox States in Polypyrrole and Polyaniline: a Comparative Study of XPS", Surf. Interf. Anal. 19, 33 (1992). Thus, by coupling the increase in the intrinsic oxidation state of these conductive polymers and their spontaneous protonation and reduction in acid solution with the decrease in the oxidation state of the metal, the process is capable of self-sustained electroless precipitation of precious metals in elemental form from acid solution.

Activated carbon was first used as a precipitant for gold in the chlorination process as early as 1880, and for the recovery of gold from cyanide solution in the 1920's. Maximum Au uptake was about 500 mg/g C. The processes have been reviewed by G. J. McDougall and R. D. Hancock, *Minerals Sci. Engng,* 12, 85 (1980).

The phenomena of sorption and biosorption have been utilized in the extraction of metallic species from solutions. Living and non-living cells and polymers have been used to concentrate metallic anions from their aqueous environment. The common phenomenon involves rapid and reversible physical/chemical adsorption of metals in the polymer and cellular structure, in combination with complexation, ion-exchange, and/or microprecipitation.

In U.S. Pat. No. 4,769,223, Sep. 6, 1988, a process is disclosed for removing Au ions from aqueous solution or suspension by biomass derived from the genus Sargassum (e.g. *Sargassum natans*), a brown sea-water algae. The maximum metal uptake is in the order of 420 mg per g dry weight of the biomass at pH 2.5. The adsorbed metal is eluted using thiourea and ferric ammonium sulfate as eluant.

In U.S. Pat. No. 4,289,531, Sep. 15, 1982, Pt, Pd and other precious metals are recovered from aqueous media containing the metal ions by contacting the solution with a proteinaceous material selected from the group consisting of feathers, hair, hoof meal and horn meal. Maximum recoveries of precious metals occur within the preferred pH range of 2 to 3. Typical recovery efficiencies for Pt from 100 ppm chloroplatinic acid are about 70–90 mg Pt/g of contact materials.

In Canadian Patent CA 2,030,900, May 28, 1991, cyanide-generating microorganisms, such as algae, bacteria or fungus, are used to leach powder Au ores for low-cost Au recovery and reconcentration. Au recovery is 76–96 ppm vs. 0.77 ppm in the absence of culture.

In Japan Kokai Tokyo Koho JP 02080528, Mar. 20, 1990, HCl solutions containing Ag and Zr ions are contacted with a cationic resin for sorption of the Ag+ ion.

In Japan Kokai Tokyo Koho JP 02015128, Jan. 18, 1990, aqueous gel containing persimmon tannin and aldehyde or acid is used for the recovery of noble metals. Thus, aqueous dilute $HAuCl_4$ solution (pH 3) containing 10 ppm Au was contacted for 1 hour with the gel to recover 98.1% of Au.

In U.S.S.R. Patent SU 1,556,735, Apr. 15, 1990, the process involves contacting the solution at various temperatures with S-containing polymeric sorbent, such as a sulfonated phenolic polymer, to increase the efficiency of Ag recovery.

In Danish Patent DK 156075 B, Jun. 19, 1989, Au is extracted from aqueous solutions containing Au, Cu and Fe in a thiourea complex from ore extraction by sorption with an acidic cation exchanger (sulfonated polystyrene resin), elution and then reductions. Overall Au recovery efficiency is at 90% for a solution containing 0.5 mg/l thiourea, 0.5 mg/l $H_2SO_4$, 0.5% $Fe_2(SO_4)_3$, 160 mg/l Cu and 70 mg/l Au.

In Australian Patent Specification, AU 564754, Aug. 27, 1987, precious metals (especially Au) in oxides or carbonaceous ores are leached with aqueous cyanide solution and recovered by adsorption on activated C. The loaded C pulp is desorbed in dilute NaOH solution at elevated temperature and pressure. The hot solution is cooled for precipitation of the precious metal and conventional recovery.

In East German Patent DD 238033, Jun. 4, 1985, Pd is selectively separated from acid solutions, especially waste solutions from reprocessing of nuclear fuels, by precipitation with ferrocyanides or sorption on ferrocyanides.

In PCT International Application WO 8603480, Jun. 19, 1986, microorganisms, such as algae on glass wool or $SiO_2$ gel, are applied under controlled conditions of pH and salt concentration to selectively recover Au, Ag, Pt or Hg. The binding of Au in $10^{-4}M$ $AuCl_4^-$ solution is high for algae concentration $>1$ mg/ml, and is insensitive to pH at 2–9.5. The bound $Au^{3+}$ or $Au^+$ is eluted as $Au^+$ by thiourea at $10^{-4}M$ in 0.01M HCl. The Au recovery for trace $Au^{+3}$ in 0.01 HCl feed solution is 75–100% when passed through a column loaded with algae supported on polyacrylamide.

In Czech Patent CS 220145, Oct. 15, 1985, Au and Pt-group metals are recovered from solutions by sorption on polymer gel containing a thiirane group or groups formed by their decomposition by $NH_3$. Thus, a macroporous 2,3-epithiopropyl acrylate-ethylenedimethacrylate copolymer containing 49% solid and having surface area of 76 $m^2/g$ absorbs Au in 24th from a medium containing 2.1M HCl at 100 mg Au/g dried weight without trapping of Cu or other metals.

In German Offen. DE 3401961, Aug. 23, 1984, a cyanide-free hydrometallurgical method is proposed for the recovery of Ag and Au from ores and other raw materials by leaching with thiourea in an acid medium. The precious metals are selectively adsorbed on activated C or cation exchanger, eluted with thiourea or acids, and recovered by electrolysis.

In East German Patent DD 200792, Jun. 15, 1983, Pd is recovered from $HNO_3$_ containing nuclear fuel regeneration solution by sorption with a chelate-forming ion exchange. For Pd loading of 45 mg/0.5 g of ion exchanger, the recovery of Pd in the desorption stage is 96%.

In U.S. Pat. No. 3,736,126, May 29, 1973, $AuCl_4^-$ anions are separated from other metals in strong acid solution as they are retained in an adsorption bed of a polymer of lower aliphatic esters of acrylic or methacrylic acid. The absorbed Au can be stripped with dimethylformamide or a mixture of 1M HCl with 2.5 times its volume of $Me_2CO$.

In U.S.S.R. Patent Su 1,956,29, Sep. 14, 1970, Pt is extracted from acid solution by sorption. To increase the effectiveness of the desorption of Pt, an amphoteric resin containing amino acid groups is used as the sorbent.

SUMMARY OF THE INVENTION

It is an object of the present invention to provide a spontaneous process, which does not require added energy, for the direct accumulation of precious metals on a polymer surface.

It is also an object of the present invention to provide a process that is self-sustaining, wherein the polymer can readily accumulate more than 500% of its own weight of the precious metals before the reduction rate is significantly retarded by the loss of effective surface area due to metal coverage.

These and other objects and advantages of the present invention are obtained by providing a method for reducing the oxidation state of a metal, comprising contacting an acidic solution of said metal, having an initial oxidation state, with an electroactive polymer, and accumulating and recovering said metal, having a final oxidation state lower than said initial oxidation state. Desirably the metal is selected from the group consisting of gold, platinum, palladium, and gold-platinum alloys, and is recovered in metallic form, having a final oxidation state of 0.

The objects and advantages of the present invention can be achieved when the concentration of metal in the acidic solution is less than 1 ppm. The acidic solution may be selected from the group consisting of mineral acid solutions, inorganic acid solutions other than mineral acid solutions, and organic acid solutions. Typically, contacting of the solution and the electroactive polymer is carried out at a pH of less than 7.

The electroactive polymer may be in the form of a film, gel, or powder. The electroactive polymer itself may be formed by polymerizing conjugated monomers containing nitrogen, may contain imine and amine moieties, and may exist in a number of intrinsic redox states arising from the imine/amine nitrogen ratios. Desirably, the electroactive polymer is selected from the group consisting of synthetic aniline polymers, synthetic pyrrole polymers, and derivatives thereof.

More particularly, said derivatives thereof may include ring-substituted and N-substituted aniline and pyrrole polymers. When the electroactive polymer is a polyaniline, leucoemeraldine, emeraldine, nigraline, pernigraline, ring-substituted and N-substituted aniline polymers of various intrinsic oxidation states, or aromatic amine polymers of various intrinsic oxidation states may be used. Most particularly, leucoemeraldine may be used. When the electroactive polymer is a polypyrrole, pyrrole polymers of various intrinsic oxidation states, deprotonated polypyrrole, or ring- and N-substituted pyrrole polymers of various intrinsic oxidation states may be used. Most particularly, fully reduced polypyrrole may be used.

The electroactive polymer used in the present invention may be prepared according to art-recognized techniques, including oxidative chemical polymerization and electrochemical polymerization.

The process of the present invention may be carried out in a batch-wise or continuous manner.

More particularly, the objects and advantages of the present invention are obtained by providing a method for recovering a precious metal selected from the group consisting of gold, platinum, palladium and gold-platinum alloys, comprising contacting an acidic solution containing said precious metal with an electroactive polymer, and accumulating and recovering said precious metal in metallic form. The electroactive polymer may be leucoemeraldine, emeraldine, nigraline, pernigraline, ring-substituted and N-substituted aniline polymers of various intrinsic oxidation states, aromatic amine polymers of various intrinsic oxidation states, pyrrole polymers of various intrinsic oxidation states, deprotonated pyrrole polymers, or ring- and N-substituted pyrrole polymers of various intrinsic oxidation states.

BRIEF DESCRIPTION OF THE DRAWINGS

FIG. 1 shows the rates of Au reduction by emeraldine base films in four different chloroauric acid solutions.

FIG. 2 shows the rates of Au reduction by emeraldine base powders in five different chloroauric acid solutions.

DESCRIPTION OF PREFERRED EMBODIMENTS

While not wishing to be bound by any theory, it is believed that the present invention is based upon the fact that by coupling the metal reduction process in acid solutions with an increase in the intrinsic oxidation state of an electroactive polymer, such as the N-containing polypyrrole, polyaniline or their derivatives, and the subsequent reprotonation and reduction of the intrinsically oxidized polymer in acid media, spontaneous and sustained reduction of precious metals to their elemental form is achieved. Thus, the said polymers are capable of precipitating, for example, Au, Pd and Au-Pt alloys from acid solutions containing the respective metal ions. The one-step, energy-free process is capable of recovering precious metals at concentrations below 1 ppm. The rate of metal reduction/recovery is dependent on the intrinsic oxidation states of the polymer, the effective surface area of the polymer and the pH of the solution.

It is well-known in the literature that a number of N-containing conjugated electroactive polymers, in particular polypyrrole, polyaniline and their derivatives, can exist in a number of intrinsic redox states. It is further known that these polymers can achieve their highly conductive state either through acid protonation of the imine nitrogens (=N—) in their oxidized forms, or through the oxidation of the amine nitrogens (—NH—) in their reduced states. The oxidation of the reduced states of the two families of polymers, and the subsequent reprotonation and reduction of the polymers at various extent of oxidation in acid solution are utilized for the spontaneous and sustained reduction of precious metals. Thus, using the redox behavior of polyaniline in aqueous chloroauric acid solution in the pH range of 1 to 4 as an example:

$$[-(C_6H_4)-N(H)-(C_6H_4)-N(H)-(C_6H_4)-N(H)-(C_6H_4)-N(H)-]_x \rightarrow [-(C_6H_4)-N(H)-(C_6H_4)-N(H)-(C_6H_4)-N^+(H)=(C_6H_4)=N^+(H)-]_x + (2x)e^- \quad (1)$$

$$[-(C_6H_4)-N(H)-(C_6H_4)-N(H)-(C_6H_4)-N^+(H)=(C_6H_4)=N^+(H)-]_x \rightarrow [-(C_6H_4)=N-(C_6H_4)=N-(C_6H_4)=N-]_x + (4x)H^+ + (2x)e^- \quad (2)$$

More recent studies have suggested that treatment of the 75% and fully oxidized polyaniline (nigraniline and pernigraniline, respectively) gives rise not to a protonated nigraniline or pernigraniline, but involves reduction to give rise to a protonated, 50% oxidized emeraldine. This reduction phenomenon allows reaction (2) to be repeated, and thus provides a continuous source of electrons for the metal reduction. Similar mechanisms are attributable to the reduction of metal ions by polypyrrole in acid solutions.

It is apparent that the rate of reaction (2) is dependent on the pH of the acid solution. Thus, a substantial increase in the rate of metal deposition is observed when the pH of the acid solution is lowered. The reaction schemes further dictate an enhanced rate of metal reduction for the fully reduced polymers, due to additional contribution from reaction (1). On the other hand, the rate of Au reduction is retarded in the more intrinsically oxidized polymer.

The selection of acid to be used in the acidic solution is not particularly important. Mineral acids which may be used include hydrochloric acid, sulfuric acid, and nitric acid. Acids other than mineral acids include those acids exemplified below. Organic acids which may be used include trifluoroacetic acid and benzenesulfonic acid. The range of concentration of acid is typically from 0.001M to 3M.

The process of the present invention is applicable to solutions having metal concentrations as low as 0.01 mg/l.

EXAMPLES

The follow specific examples are provided to illustrate this invention and the manner in which it may be carried out. It will be understood, however, that the specific details given in each example have been selected for purpose of illustration and are not to be construed as a limitation on the invention. In all these examples, the general conditions under which the experiments were conducted were similar, and almost 100% of the initial Au content were recovered in the process. pH typically ranged from 0 to 2.5. Example 1 provides more details on the conduct of the experiment. In the examples where polymer films were used, Au was recovered on the films, while in the case of polymer powder, the contents were centrifuged in order to recover the Au-laden powder.

EXAMPLE 1

In a preferred experimental scale process, emeraldine base films of size 3 cm×3 cm (total surface area of 18 cm², both sides) and 12 μm in thickness were exposed to 150 ml of chloroauric acid solutions in several 500 ml Erlenmeyer flasks with Au concentrations ranging from 10 to 100 mg dm$^{-3}$. The contents of the flask were kept homogeneous by slowly stirring with a magnetic stirrer at about 200 rpm. Initial pH typically ranged from about 0 to 2.5. During the reduction process, the concentration of AuCl$_4^-$ remaining in each solution was determined from the UV-visible absorption peak at about 312 nm. At the end of each experiment, about 100% of the initial amount of Au was recovered on the film. FIG. 1 illustrates the rates of Au reduction by the emeraldine base films in four different chloroauric acid solutions.

EXAMPLE 2

The rate of Au reduction was substantially enhanced (by more than 10-folds) when emeraldine base powder (e.g. particle size, Sauter mean diameter about 30 μm) of comparable weight as the film was used. FIG. 2 compares the rates of Au reduction by the said emeraldine base powders in five different chloroauric acid solutions.

EXAMPLE 3

An even more rapid rate of Au reduction was observed in the case of deprotonated polypyrrole powders (containing 25%=N— structure) of similar particle size and under the same experimental conditions.

EXAMPLE 4

In a preferred process, the fully reduced leucoemeraldine films were used for the reduction of Au from chloroauric acid solution having Au concentrations ranging from 10 to 100 mg dm$^{-3}$. The fully reduced leucoemeraldine exhibited a substantially higher rate of Au reduction, at least during the initial stage, than its 50% oxidized emeraldine and 75% oxidized nigraniline counterparts.

EXAMPLE 5

In a preferred process, a fully reduced leucoemeraldine film was subjected to cyclic loading of Au by exposing the film to consecutive batches of chloroauric acid solution containing 100 mg dm$^{-3}$ of Au. The polymer film accumulated more than 5 times its own weight of elemental gold.

EXAMPLE 6

In another preferred process, the rates of Au reduction by polyaniline and polypyrrole were substantially enhanced if the pH values of the acid Au solutions were adjusted to 1 or below.

EXAMPLE 7

In yet another preferred process, either polyaniline or polypyrrole was used for the reduction and accumulation of Pd in nitric acid; or for the reduction and accumulation of Pt in chloroplatinic acid containing also trace amount of chloroauric acid.

To those skilled in the art to which this invention relates, many change in construction and widely differing embodiments and applications of the invention will suggest themselves without departing from the spirit and scope of the invention. The disclosures and the descriptions herein are purely illustrative and are not intended to be in any sense limiting.

We claim:

1. A method for reducing the oxidation state of a metal, comprising contacting an acidic solution of said metal, having an initial oxidation state, with an electroactive polymer, and accumulating and recovering said metal, having a final oxidation state lower than said initial oxidation state.

2. The method according to claim 1, wherein said metal is selected from the group consisting of gold, platinum, palladium, and gold-platinum alloys.

3. The method according to claim 2, wherein said final oxidation state is 0, and said metal is accumulated and recovered in metallic form.

4. The method according to claim 1, wherein the concentration of said metal in said acidic solution is less than 1 ppm.

5. The method according to claim 1, wherein said acidic solution of said metals are selected from the group consisting of mineral acid solutions, inorganic acid solutions other than mineral acid solutions, and organic acid solutions.

6. The method according to claim 1, wherein said contacting is carried out at a pH of less than 7.

7. The method according to claim 1, wherein said electroactive polymer is in the form of a film, fiber, gel, or powder.

8. The method according to claim 1, wherein said electroactive polymer is formed by polymerizing conjugated monomers containing nitrogen.

9. The method according to claim 8, wherein said electroactive polymer contains imine and amine moieties, and which exists in a number of intrinsic redox states arising from the imine/amine nitrogen ratios.

10. The method according to claim 8, wherein said electroactive polymer is selected from the group consisting of synthetic aniline polymers, synthetic pyrrole polymers, and derivatives thereof.

11. The method according to claim 10, wherein said electroactive polymer is selected from the group consisting of synthetic aniline polymers, ring-substituted and N-substituted aniline polymers, aromatic amine polymers and derivatives thereof.

12. The method according to claim 10, wherein said electroactive polymer is selected from the group consisting of synthetic pyrrole polymers, ring-substituted and N-substituted pyrrole polymers, and derivatives thereof.

13. The method according to claim 11, wherein said electroactive polymer is selected from the group consisting of leucoemeraldine, emeraldine, nigraline, pernigraline, ring-substituted and N-substituted aniline polymers of various intrinsic oxidation states, and aromatic amine polymers of various intrinsic oxidation states.

14. The method according to claim 13, wherein said electroactive polymer is leucoemeraldine.

15. The method according to claim 12, wherein said electroactive polymer is selected from the group consisting of pyrrole polymers of various intrinsic oxidation states, of deprotonated polypyrrole, and of ring- and N-substituted pyrrole polymers of various intrinsic oxidation states.

16. The method according to claim 15, wherein said electroactive polymer is the fully reduced polypyrrole.

17. The method according to claim 10, wherein said electroactive polymer is synthesized by oxidative chemical polymerization.

18. The method according to claim 10, wherein said electroactive polymer is synthesized by electrochemical polymerization.

19. The method according to claim 1, wherein said method is carried out in a batch-wise manner.

20. The method according to claim 1, wherein said carried out in a continuous manner.

21. A method of recovering a precious metal selected from the group consisting of gold, platinum, palladium and gold-platinum alloys, comprising contacting an acidic solution containing said precious metal with an electroactive polymer, and accumulating and recovering said precious metal in metallic form.

22. The method according to claim 19, wherein said electroactive polymer is selected from the group consisting of leucoemeraldine, emeraldine, nigraline, pernigraline, ring-substituted and N-substituted aniline polymers of various intrinsic oxidation states, and aromatic amine polymers of various intrinsic oxidation states.

23. The method according to claim 19, wherein said electroactive polymer is selected from the group consisting of pyrrole polymers of various intrinsic oxidation states, of deprotonated pyrrole polymers, and of ring- and N-substituted pyrrole polymers of various intrinsic oxidation states.

* * * * *